(12) United States Patent
Chao

(10) Patent No.: US 7,215,490 B2
(45) Date of Patent: May 8, 2007

(54) METHOD FOR MAKING A LENS BARREL

(75) Inventor: Sheng-Jui Chao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 90 days.

(21) Appl. No.: 11/193,659

(22) Filed: Jul. 28, 2005

(65) Prior Publication Data
US 2006/0103950 A1    May 18, 2006

(30) Foreign Application Priority Data
Nov. 16, 2004    (TW) .............................. 93135097 A

(51) Int. Cl.
*G02B 15/14* (2006.01)
*B29D 11/00* (2006.01)

(52) U.S. Cl. ........................... 359/704; 264/2.5
(58) Field of Classification Search ........ 359/699–704, 359/811, 819, 820; 264/2.5, 2.4, 221
See application file for complete search history.

(56) References Cited

U.S. PATENT DOCUMENTS 4,385,023 A * 5/1983 Sumi .......................... 264/221
6,549,347 B1 * 4/2003 Spinali ....................... 359/819

* cited by examiner

*Primary Examiner*—Ricky Mack
*Assistant Examiner*—M. Hasan
(74) *Attorney, Agent, or Firm*—DLA Piper US LLP

(57) ABSTRACT

A method for making a lens barrel includes the steps of: (a) forming a fusible mold core having at least one flange; (b) applying an insulating layer on the fusible mold core; (c) disposing the fusible mold core in a lens-barrel-forming mold; (d) feeding a molding material into the lens-barrel-forming mold to form the lens barrel between the lens-barrel-forming mold and the fusible mold core and adhered to the fusible mold core, the lens barrel having at least one inner cam groove corresponding to the flange of the fusible mold core; (e) removing the lens barrel together with the fusible mold core from the lens-barrel-forming mold; and (f) fusing the fusible mold core for separating the fusible mold core from the lens barrel.

10 Claims, 17 Drawing Sheets

METHOD FOR MAKING A LENS BARREL

CROSS-REFERENCE TO RELATED APPLICATION

This application claims priority of Taiwanese Application No. 093135097, filed on Nov. 16, 2004.

BACKGROUND OF THE INVENTION

1. Field of the Invention

The invention relates to a method for making a lens barrel, more particularly to a method for making a lens barrel having at least one inner cam groove.

2. Description of the Related Art

A conventional zoom lens assembly for a camera usually includes a lens barrel and a plurality of lenses. The lens barrel is formed with a plurality of blind cam grooves in an inner surface thereof. The lenses have guide pins corresponding to and cooperating with the cam grooves of the lens barrel to change relative distances between the lenses so as to obtain a zooming effect. Since the conventional zoom lens assembly has a relatively large size, the lens barrel can be made using a mold together with a wedge mold core having a plurality of flanges on an outer surface thereof for forming the cam grooves. The lens barrel made thereby has a plurality of blind cam grooves in the inner surface thereof.

However, when it is desired to use the zoom lens assembly in a camera of a camera phone, the space provided in the camera phone for mounting the zoom lens assembly is limited. Therefore, the zoom lens assembly is required to be minimized in size. The aforesaid method cannot be used to make the miniaturized zoom lens assembly applicable to camera phones.

Referring to FIGS. 1 and 2, a mold assembly 1 in conjunction with a mold core 2 was proposed heretofore to make a lens barrel 3 suitable for use in a camera phone. The mold assembly 1 is composed of a plurality of mold portions 101 each formed with a plurality of flanges 1011. The mold core 2 has a smooth outer peripheral surface 201. When the mold assembly 1 is assembled together with the mold core 2 in a manner that the flanges 1011 on the mold portions 101 abut against the smooth outer peripheral surface 201 of the mold core 2, a plastic material can be injected into a molding space defined between the mold assembly 1 and the mold core 2 so as to make the lens barrel 3 having a plurality of cam slots 301 corresponding to the flanges 1011 and extending through the lens barrel 3.

Although the aforesaid prior art can be used to make the lens barrel 3 useful in a miniaturized zoom lens for a camera phone, there are the following disadvantages that need to be addressed:

1. Since the cam slots 301 of the lens barrel 3 extend through the lens barrel 3, the zoom lens assembly that incorporates the lens barrel 3 usually encounters a problem of light leaking through the cam slots 301. Therefore, it is required to add an outer barrel (not shown) to solve the light leakage problem, which in turn increases the production costs.

2. Referring to FIG. 3, since the plastic material usually penetrates into the spaces between the flanges 1011 and the smooth outer peripheral surface 201 of the mold core 2 during the molding process, the lens barrel 3 made by the prior art unavoidably has burr edges 302 formed at the cam slots 301. Therefore, further processing is required to remove the burr edges 302, which also increases the production costs.

SUMMARY OF THE INVENTION

The object of the present invention is to provide a method for making a lens barrel having at least one inner cam groove, which can overcome the aforesaid disadvantages of the prior art.

Accordingly, a method for making a lens barrel having at least one inner cam groove of this invention includes the steps of:

(a) forming a fusible alloy into a fusible mold core having an outer peripheral surface and at least one flange protruding from the outer peripheral surface;

(b) applying an insulating layer on the outer peripheral surface and the flange of the fusible mold core;

(c) disposing the fusible mold core in a mold cavity of a lens-barrel-forming mold;

(d) feeding a molding material into the mold cavity of the lens-barrel-forming mold so as to form the lens barrel between the lens-barrel-forming mold and the fusible mold core and adhered to the fusible mold core, the lens barrel having an inner surface corresponding to the outer peripheral surface of the fusible mold core and defining an inner hole and the inner cam groove recessed from the inner surface and corresponding to the flange of the fusible mold core;

(e) removing the lens barrel together with the fusible mold core from the mold cavity of the lens-barrel-forming mold; and (f) fusing the fusible mold core for separating the fusible mold core from the lens barrel.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
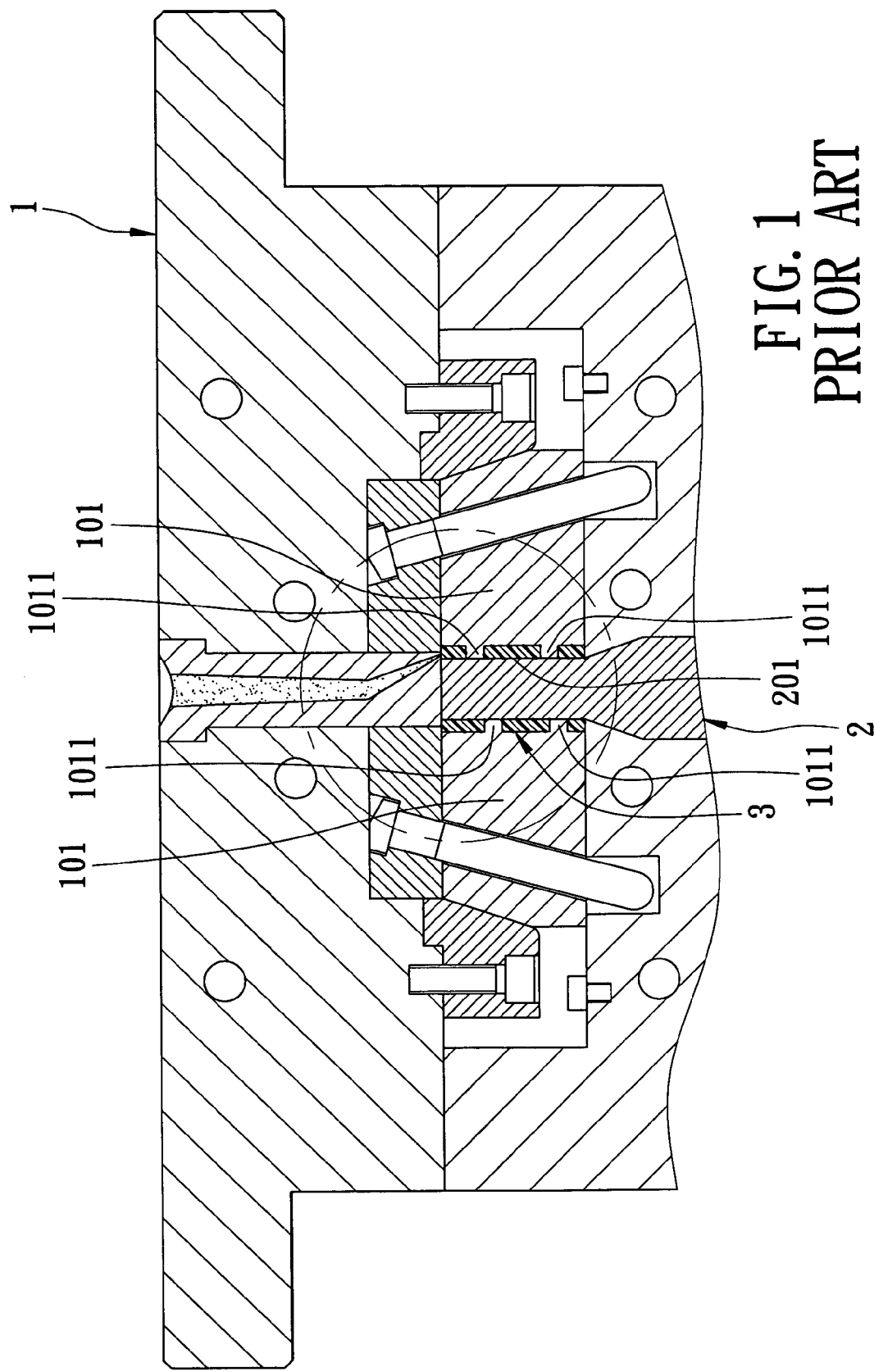
FIG. 1 is a fragmentary sectional view showing a conventional molding device used for conducting a conventional method for making a miniaturized lens barrel.
Figure 2:
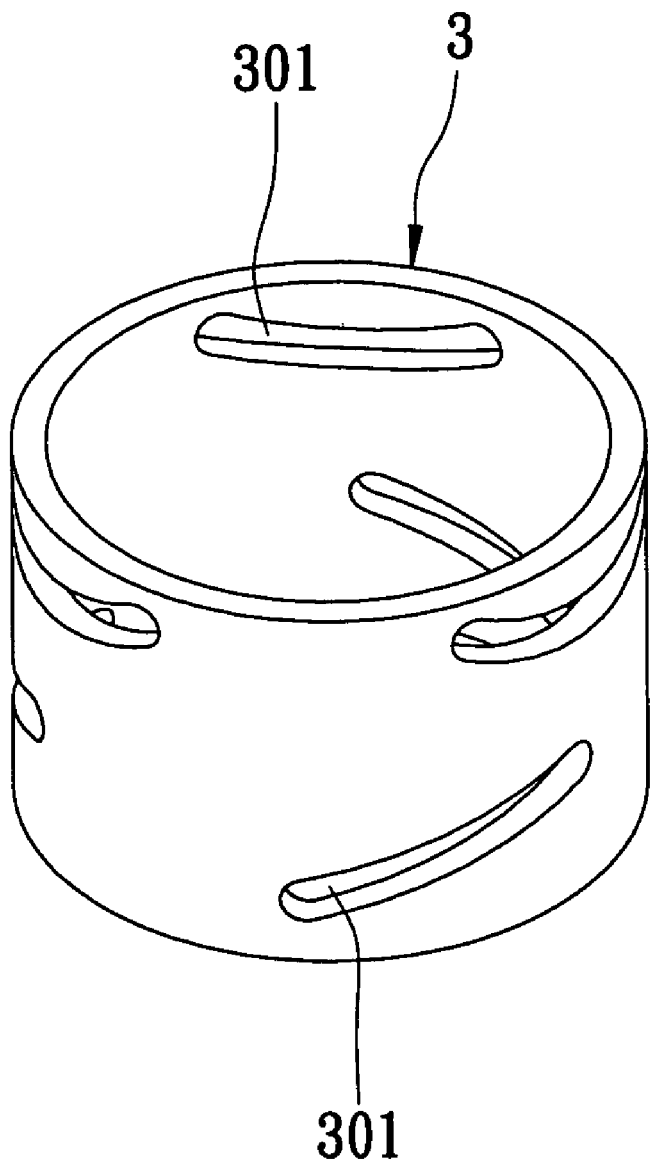
FIG. 2 is a perspective view of the miniaturized lens barrel made by the conventional method.
Figure 3:
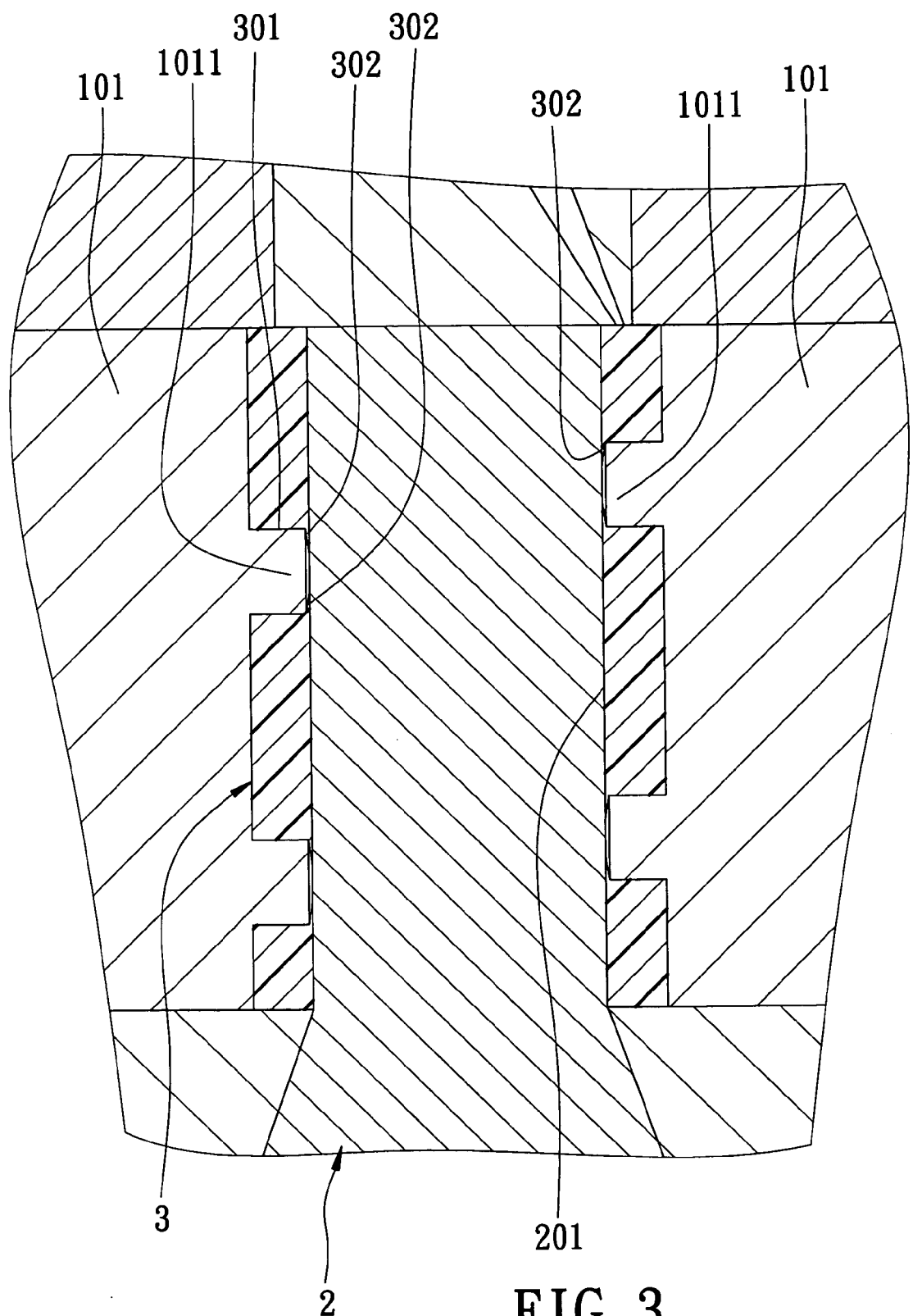
FIG. 3 is an enlarged fragmentary sectional view of the conventional molding device of FIG. 1.
Figure 4:
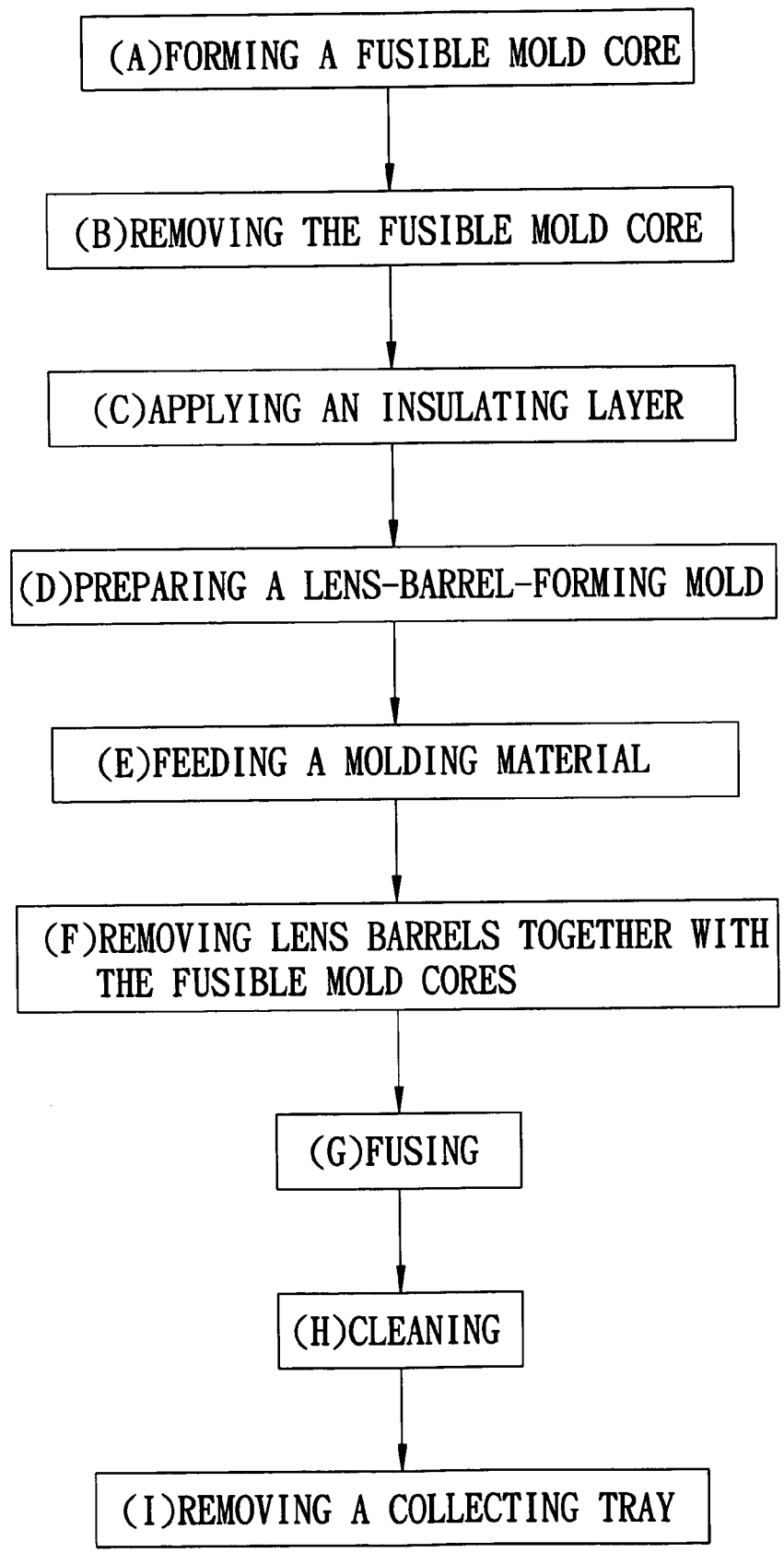
FIG. 4 is a flow diagram of the preferred embodiment of a method for making a lens barrel having at least one inner cam groove according to this invention.
Figure 5:
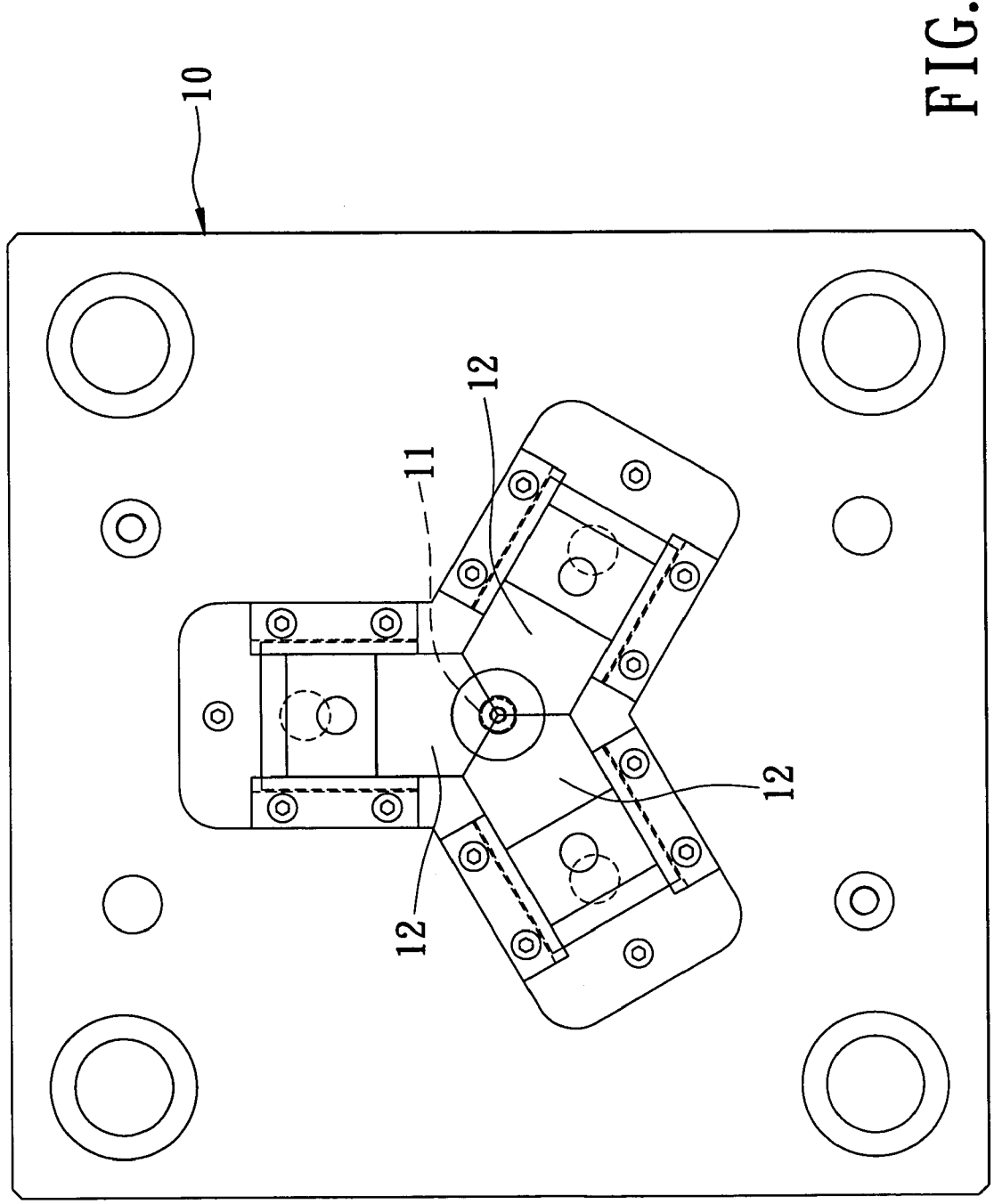
FIGS. 5 to 16 illustrate consecutive steps of the preferred embodiment of FIG. 4.
Figure 6:
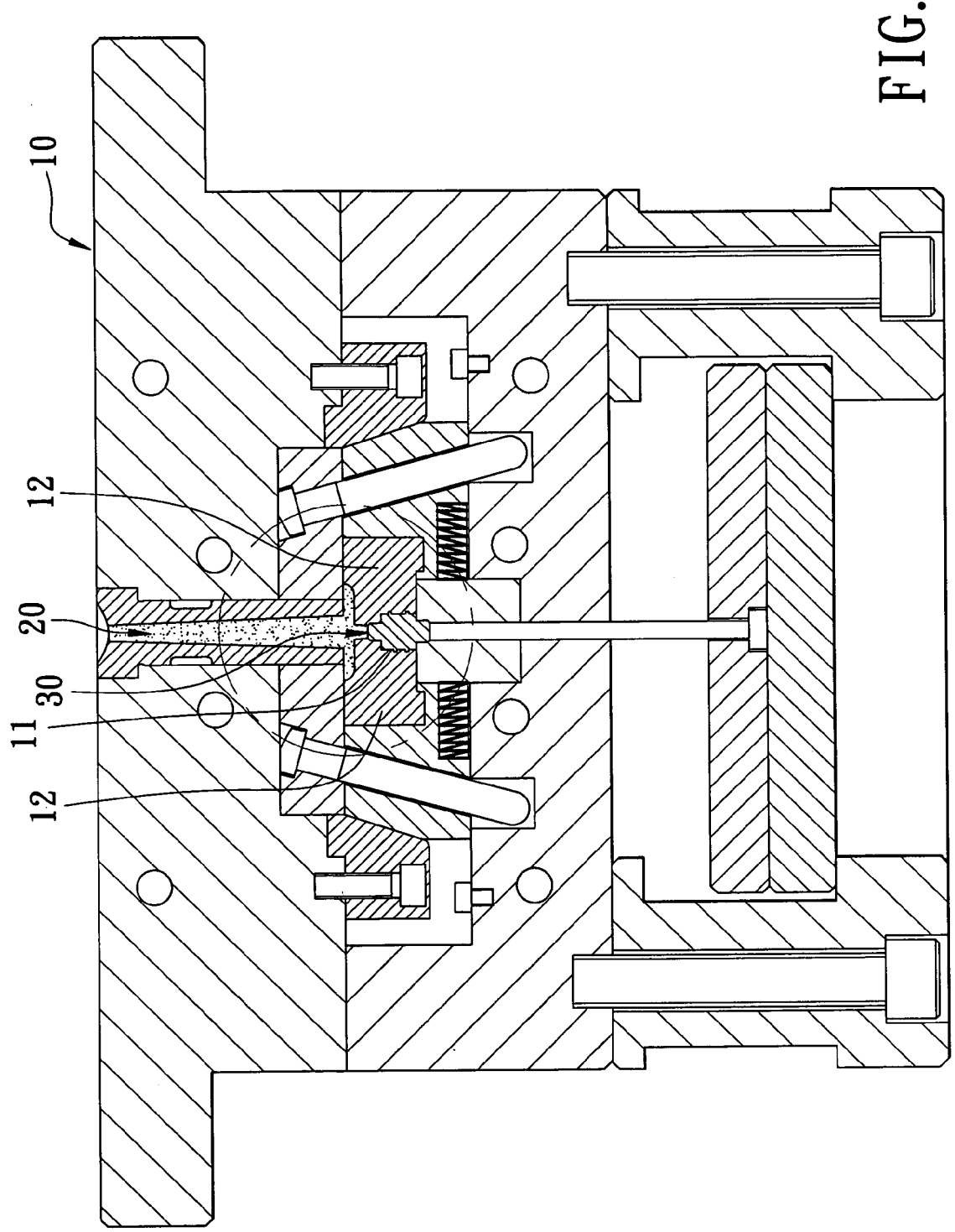
Figure 7:
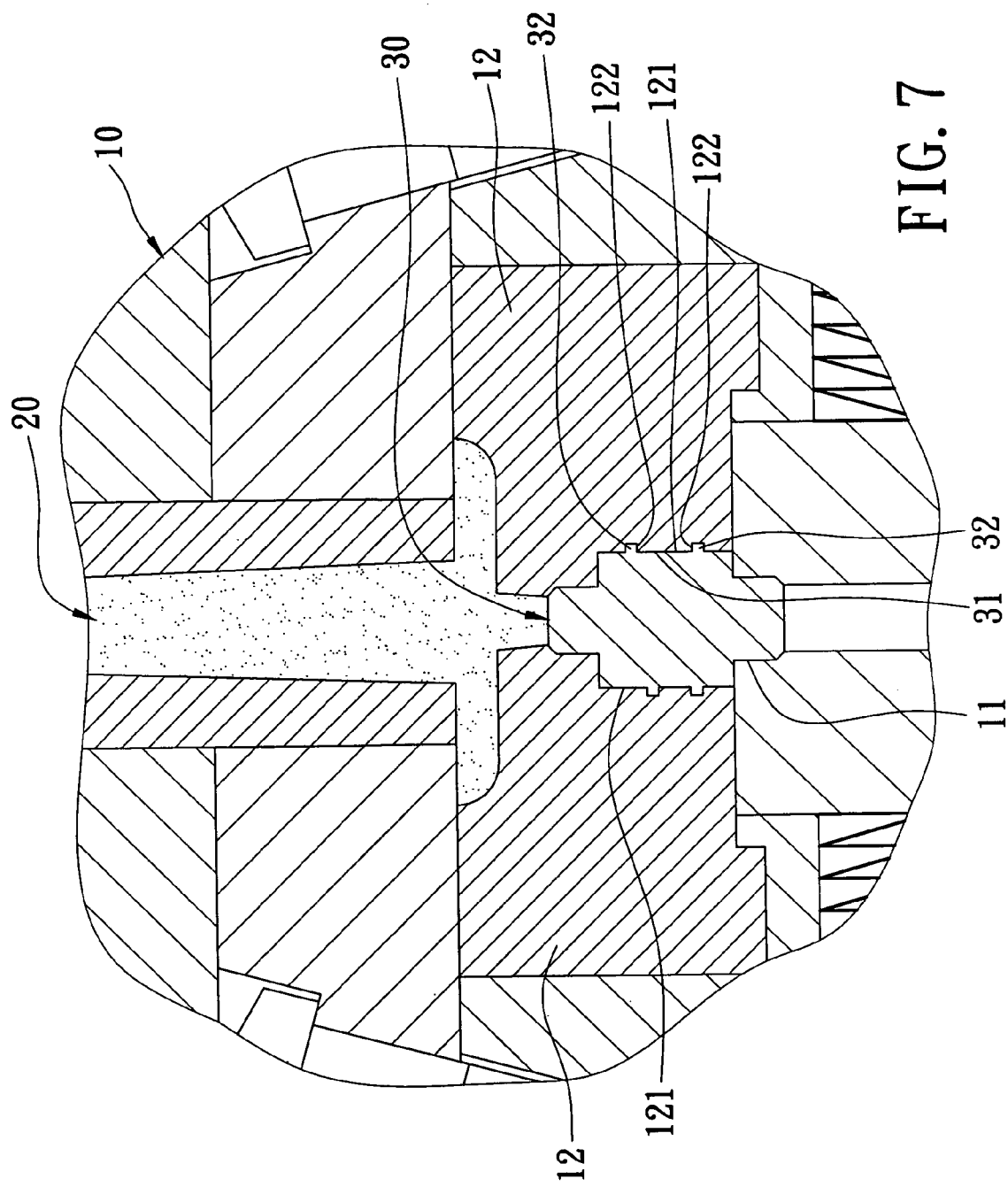

Referring to FIG. 4, the preferred embodiment of the method for making a lens barrel 80 having at least one inner cam groove 82 (best shown in FIG. 17) according to this invention includes the following steps:

A) Forming a Fusible Mold Core:

Referring to FIGS. 5, 6 and 7, a mold-core-forming die 10 is prepared. The mold-core-forming die 10 includes a plurality of die portions 12 that cooperate to define a die cavity 11. Each of the die portions 12 has a molding surface 121 and a plurality of recesses 122 recessed from the molding surface 121. A fusible alloy 20 is fed into the die cavity 11 of the mold-core-forming die 10 by injection so as to form a fusible mold core 30 having an outer peripheral surface 31 and a plurality of flanges 32 protruding from the outer peripheral surface 31 and corresponding to the recesses 122. In the preferred embodiment, the fusible alloy 20 includes bismuth, lead, tin, cadmium, and indium, and has a melting temperature not less than 186° C.

Figure 8:
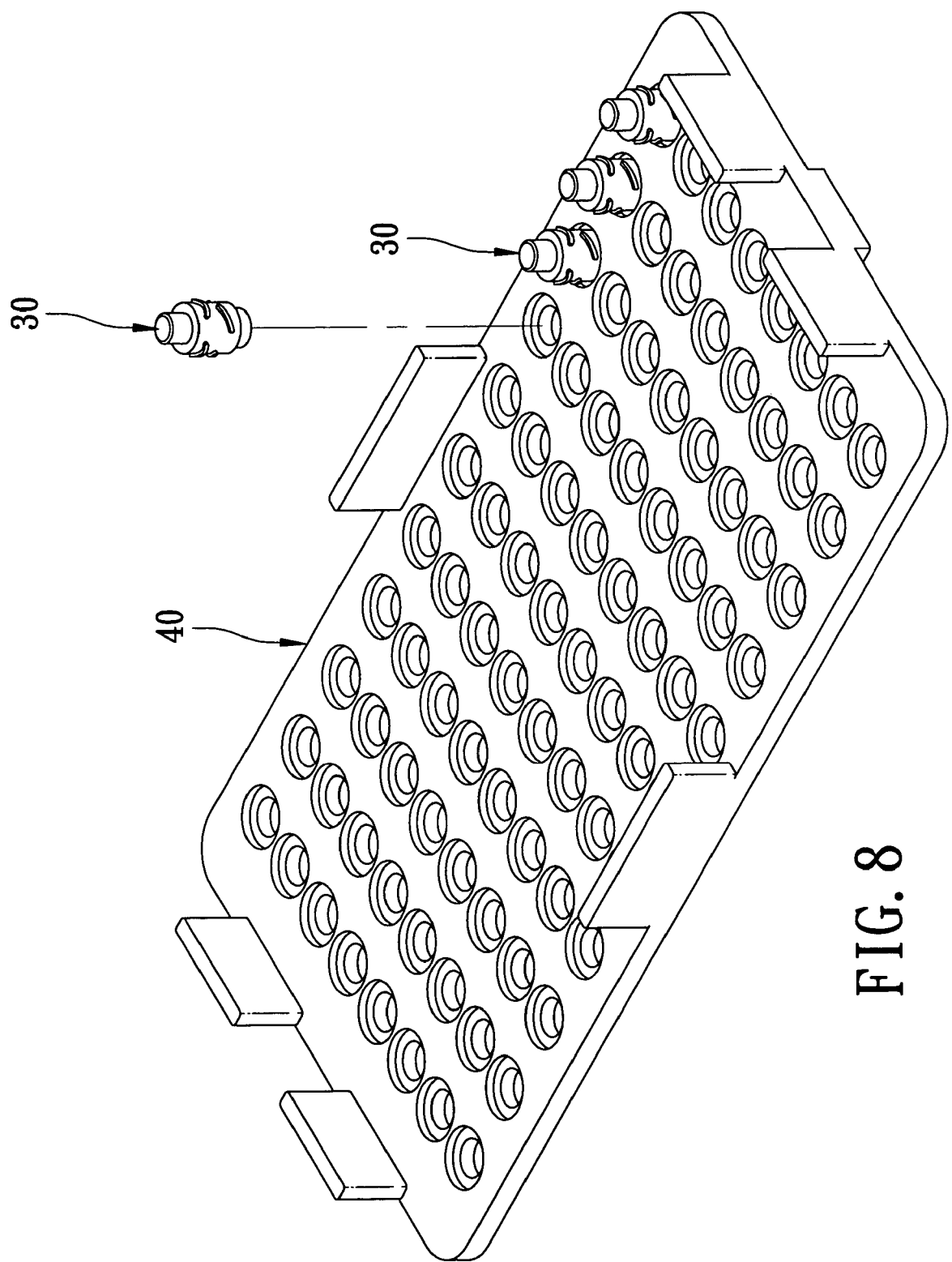

B) Removing the Fusible Mold Core 30:

Referring to FIGS. 6 and 8, after the fusible mold core 30 has solidified, the mold-core-forming die 10 is opened. The fusible mold core 30 is removed from the die cavity 11 using a robot arm (not shown) and is disposed on a collecting tray 40.

Figure 9:
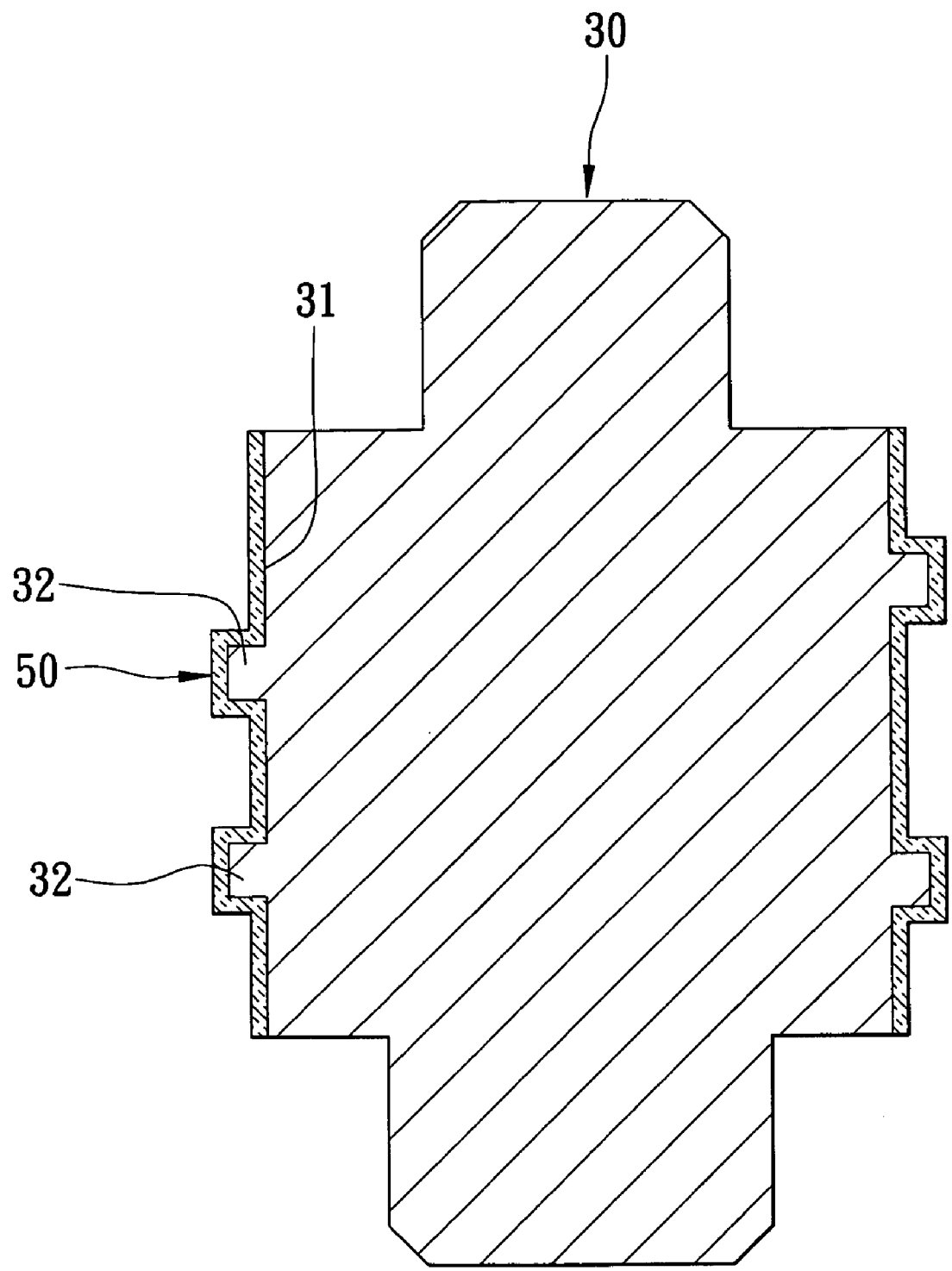

C) Applying an Insulating Layer:

Referring to FIG. 9, an insulating layer 50 is applied on the outer peripheral surface 31 and the flanges 32 of the fusible mold core 30. In the preferred embodiment, the insulating layer 50 is made of a graphite-containing release agent commercially available from Audec Co., Ltd, Japan (Model No. BLUB 420) and having a refractory temperature not less than 315° C. Application of the insulating layer 50 is preferably conducted by spraying.

Figure 10:
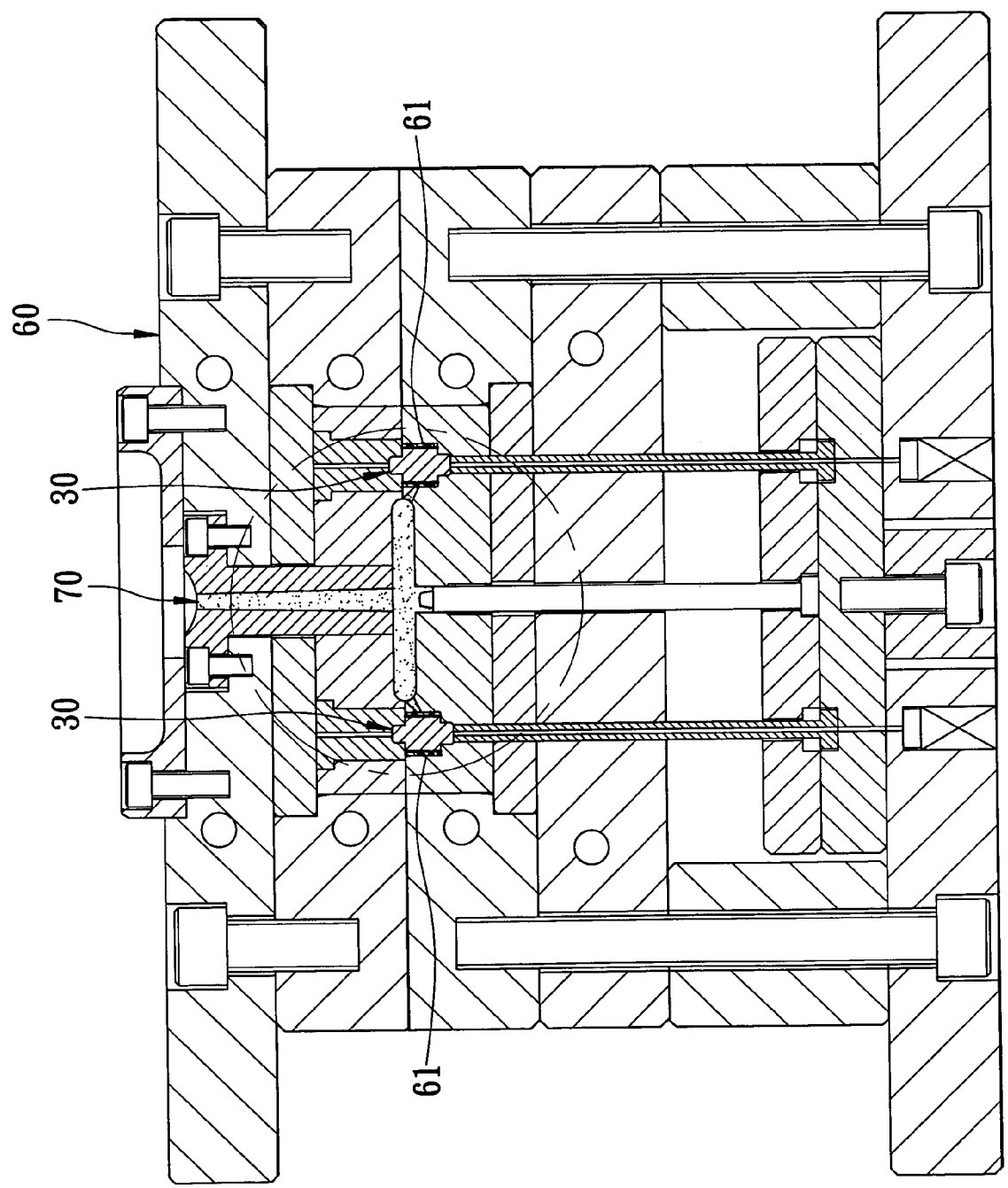
Figure 11:
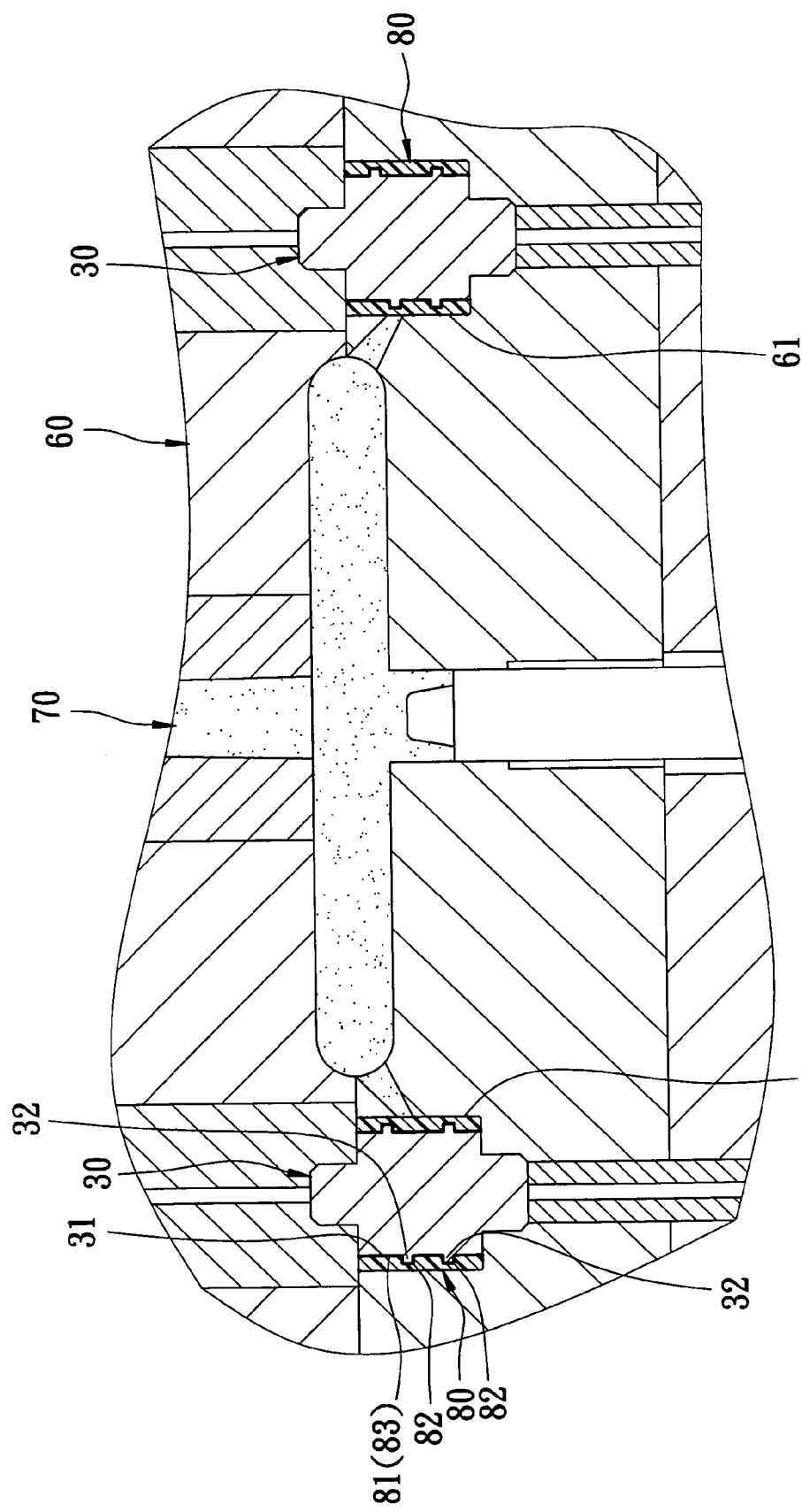

D) Preparing a Lens-Barrel-Forming Mold:

Referring to FIGS. 10 and 11, a lens-barrel-forming mold 60 is prepared, which includes a plurality of mold cavities 61. A plurality of the fusible mold cores 30 are disposed respectively in the mold cavities 61 of the lens-barrel-forming mold 60 using a robot arm (not shown).

E) Feeding a Molding Material:

Referring to FIGS. 10 and 11, a molding material 70 is fed into each of the mold cavities 61 of the lens-barrel-forming mold 60 by injection so as to form the lens barrels 80 between cavity-defining walls of the mold cavities 61 of the lens-barrel-forming mold 60 and the fusible mold cores 30. Each of the lens barrels 80 is adhered to a corresponding one of the fusible mold cores 30, and has an inner surface 81 corresponding to the outer peripheral surface 31 of the corresponding one of the fusible mold cores 30 and defining an inner hole 83 and a plurality of inner cam grooves 82 recessed from the inner surface 81 and corresponding to the flanges 32 of the corresponding one of the fusible mold cores 30. The molding material 70 used in the preferred embodiment is a plastic material that includes a polycarbonate and fiber.

Figure 12:
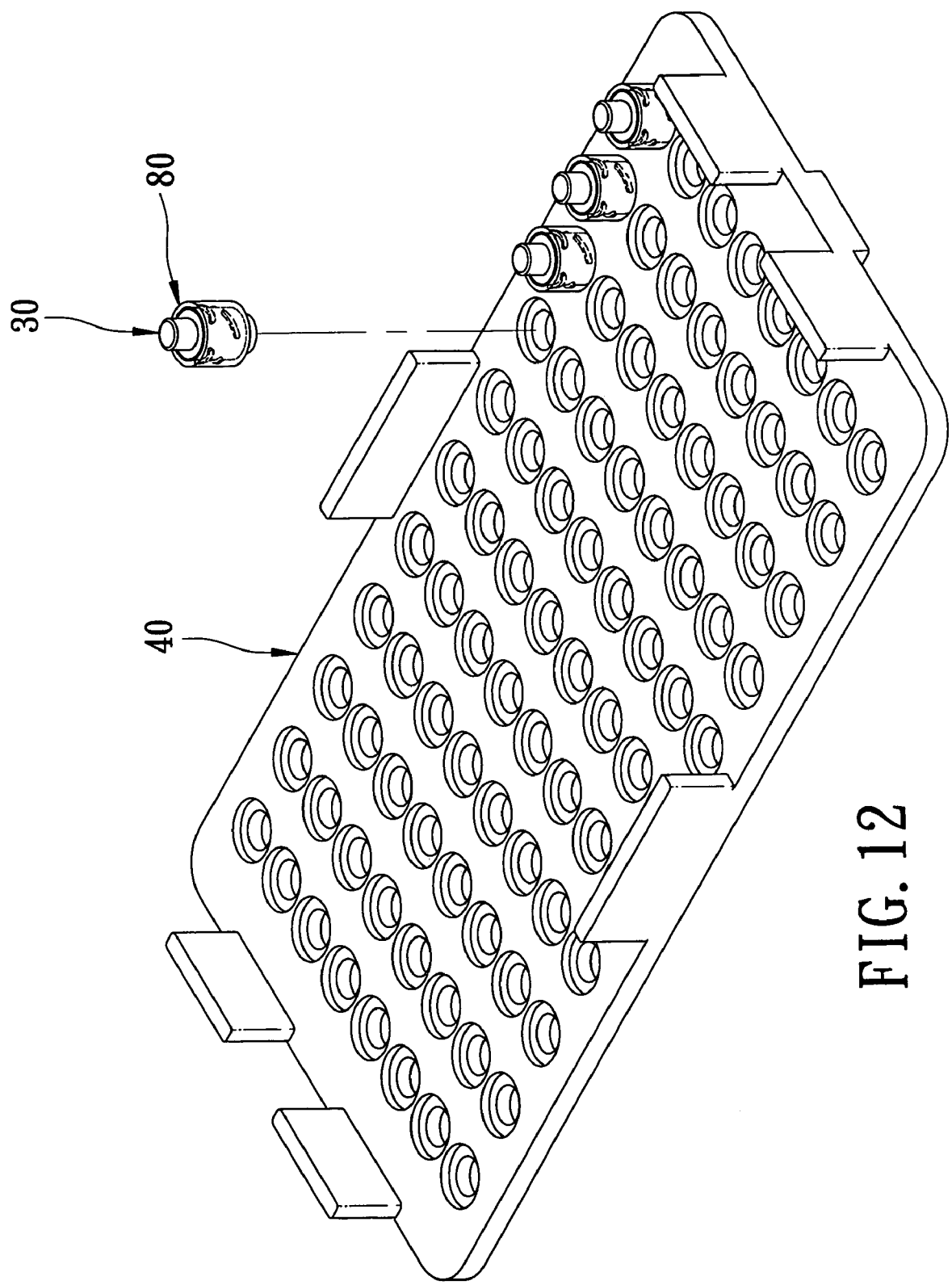

F) Removing the Lens Barrels 80 Together with the Fusible Mold Cores 30:

Referring to FIGS. 10 and 12, the lens-barrel-forming mold 60 is opened. Each of the lens barrels 80 adhered to the corresponding one of the fusible mold cores 30 is removed from the corresponding one of the mold cavities 61 of the lens-barrel-forming mold 60 using a robot arm (not shown) and is disposed on the collecting tray 40.

Figure 13:
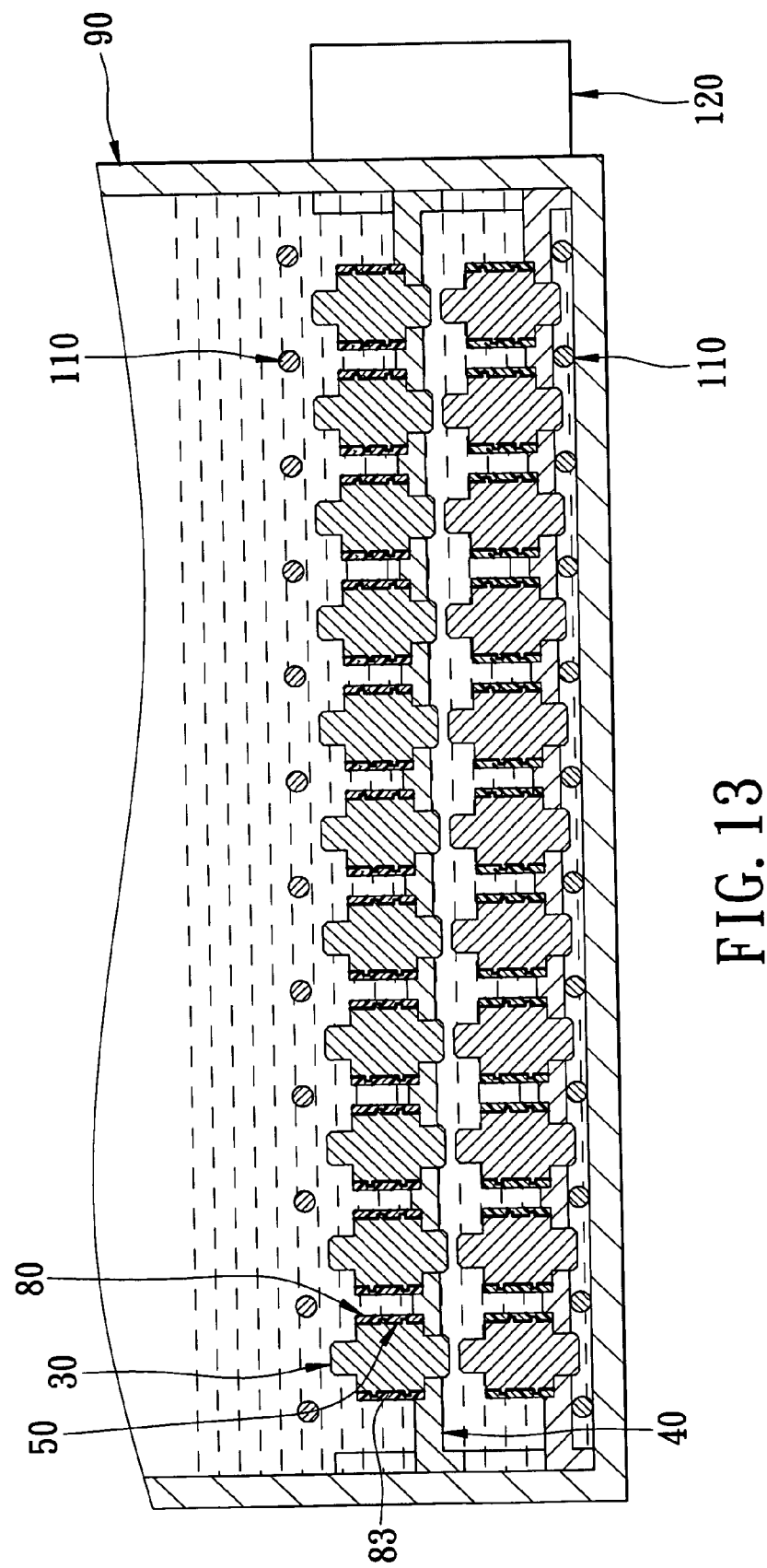
Figure 14:
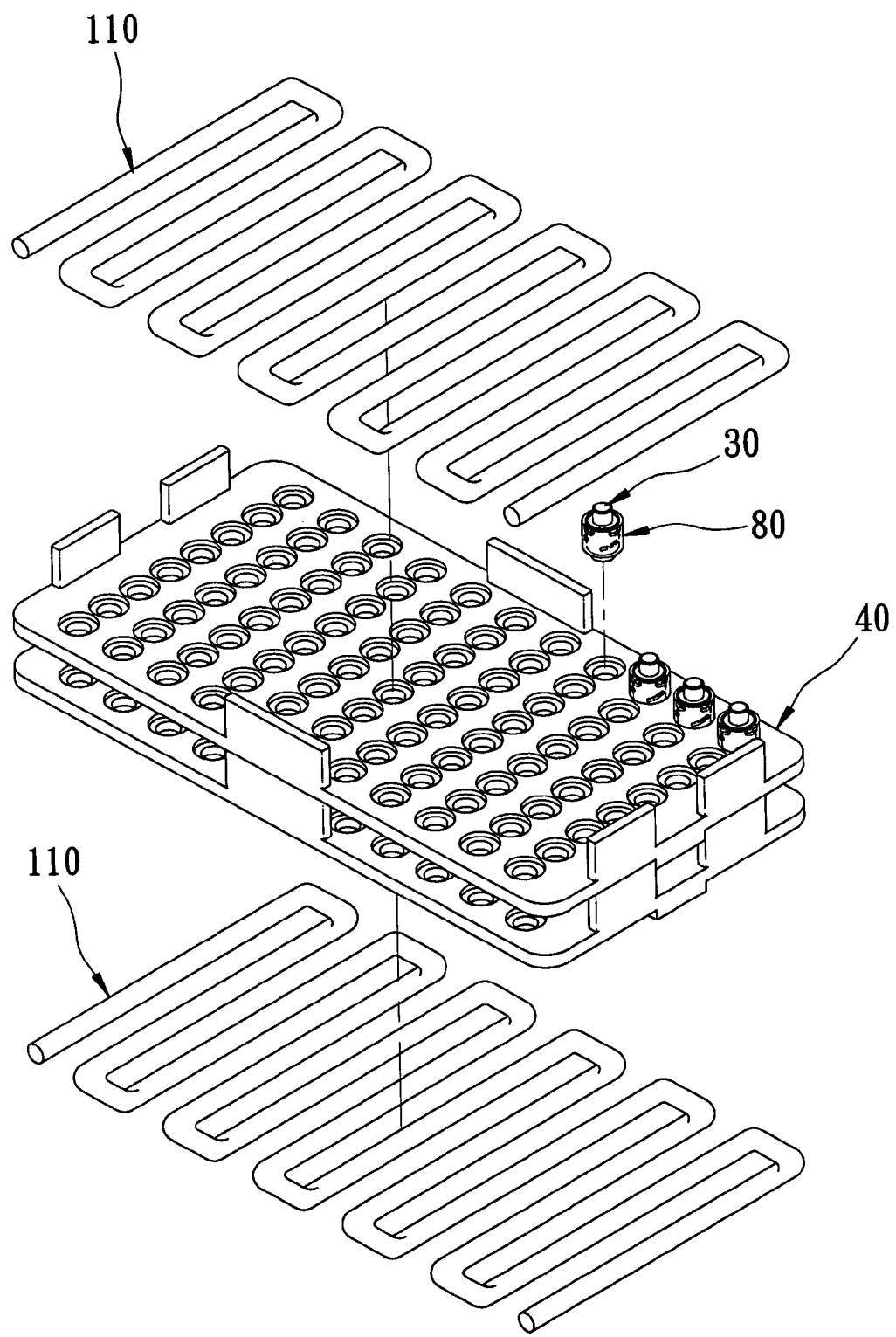
Figure 15:
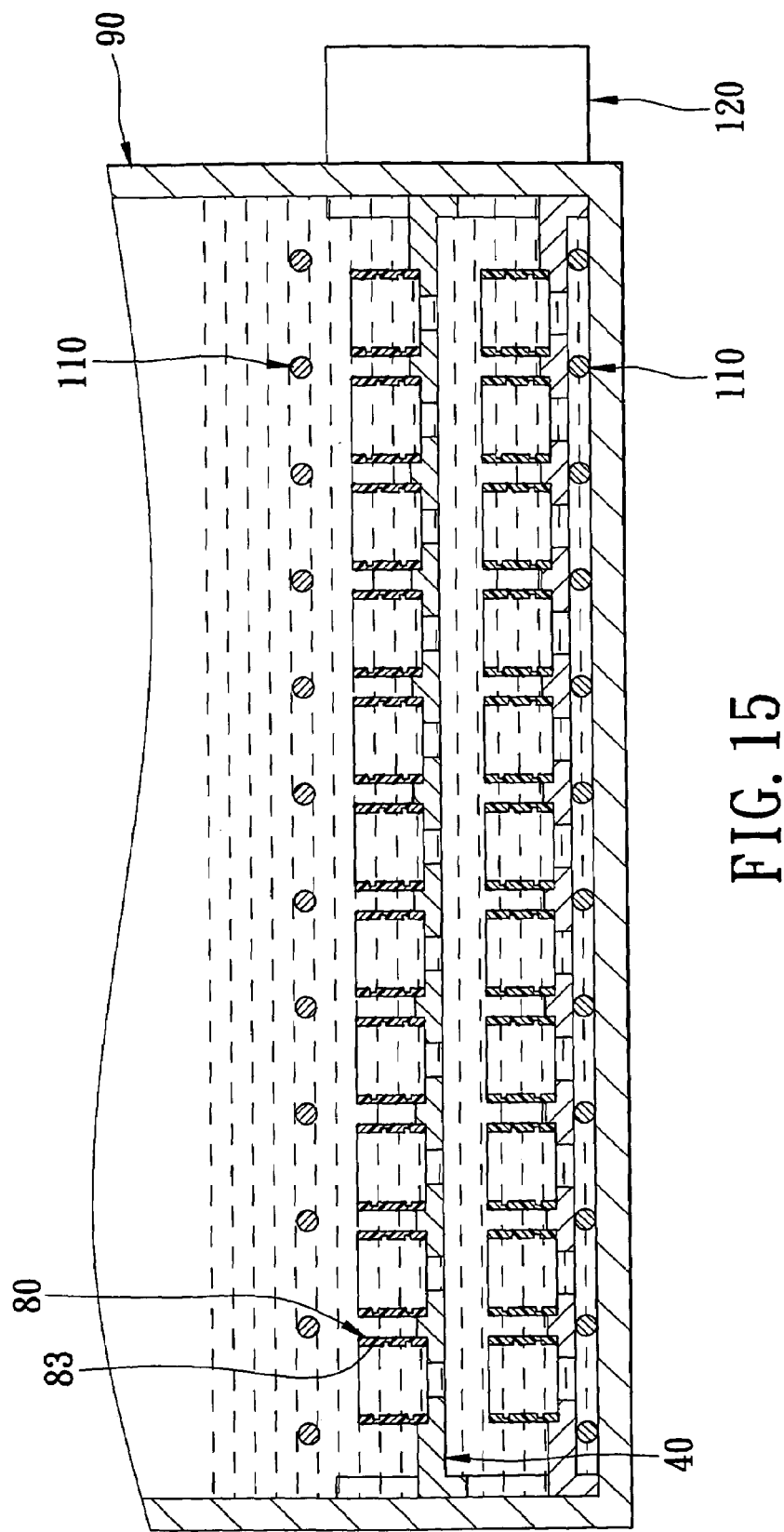

G) Fusing:

Referring to FIGS. 13, 14 and 15, the collecting tray 40 together with the lens barrels 80 adhered correspondingly to the fusible mold cores 30 is disposed in a treatment tank 90 installed with two conducting coils 110 electrically connected to a high frequency power supply (not shown) and containing water and a treating agent. Each of the fusible mold cores 30 is fused by eddy current induction heating of the conducting coils 110 and is thus separated from the corresponding one of the lens barrels 80 by flowing through the inner hole 83 of the corresponding one of the lens barrels 80. The fusing process is conducted at a temperature of 200° C. for about 35 seconds. Since the insulating layer 50 is sandwiched between each of the fusible mold cores 30 and the corresponding one of the lens barrels 80, the lens barrels 80 can be prevented from deforming during the fusing process. The fusible alloy fused by the fusing process can be collected from the bottom of the treatment tank 90 for recycling.

H) Cleaning:

Referring to FIGS. 13 and 15, the lens barrels 80 are cleaned by supersonic cleaning treatment so as to remove the insulating layer 50 from each of the lens barrels 80. The supersonic cleaning treatment is conducted by a supersonic wave generator 120 mounted on the treatment tank 90.

Figure 16:
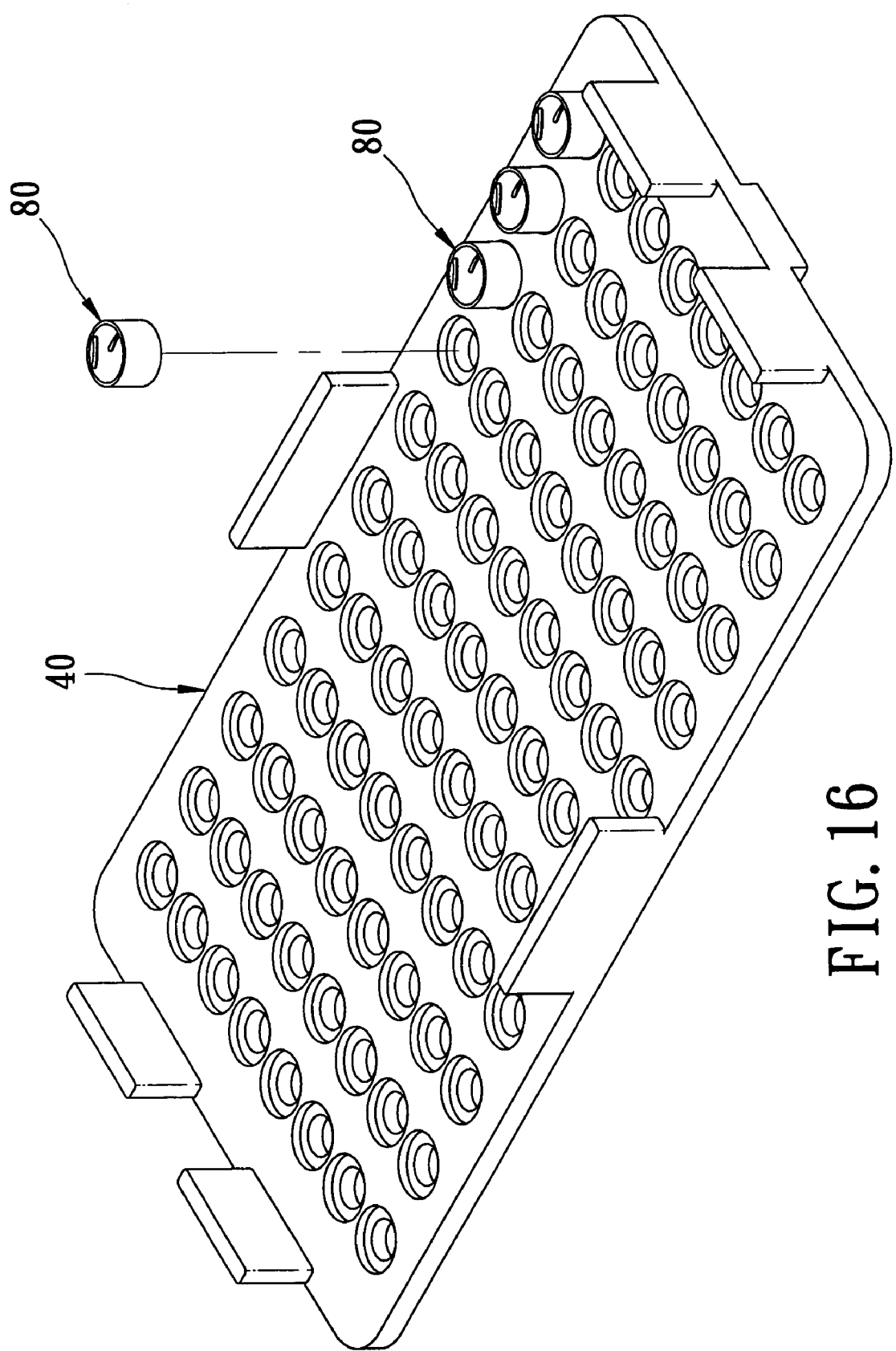
Figure 17:
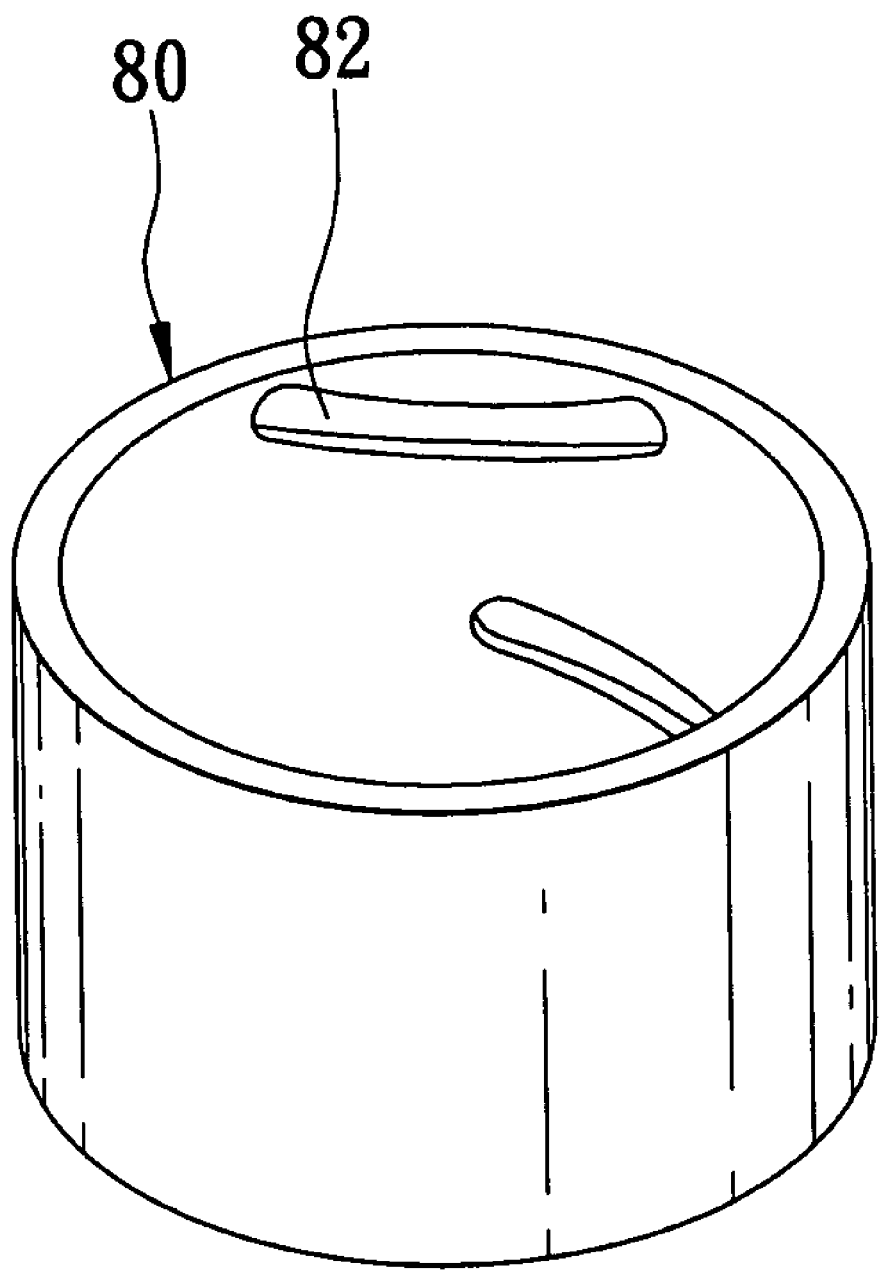
FIG. 17 is a perspective view of the lens barrel made by the preferred embodiment.

I) Removing the Collecting Tray 40:

Referring to FIGS. 16 and 17, the collecting tray 40 together with the lens barrels 80 disposed thereon is removed from the treatment tank 90 so as to obtain the lens barrels 80, each of which is formed with a plurality of the inner cam grooves 82.

In view of the aforesaid, the method of this invention has the following advantages:

1. In the method of this invention, the fusible mold core 30 having the flanges 32 is formed, which is then used to make the lens barrel 80 having the inner cam grooves 82 corresponding to the flanges 32 of the fusible mold core 30. Since the inner cam grooves 82 of the lens barrel 80 made by the method of this invention are blind, the light-leakage problem encountered in the prior art can be avoided. Therefore, there is no need to install an additional outer barrel, which is required in the prior art, in the zoom lens assembly that incorporates the lens barrel 80. Hence, the production costs can be lowered as compared to the prior art.

2. In the method of this invention, the molding material 70 for the lens barrel 80 is injected into each of the mold cavities 61 of the lens-barrel-forming mold 60 to form the lens barrels 80 adhered directly to the fusible mold cores 30. Each lens barrel 80 made by the method of this invention has no burr edges. Therefore, further processing for burr edge removal is not required in this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for making a lens barrel having at least one inner cam groove, comprising the steps of:
    (a) forming a fusible alloy into a fusible mold core having an outer peripheral surface and at least one flange protruding from the outer peripheral surface;
    (b) applying an insulating layer on the outer peripheral surface and the flange of the fusible mold core;
    (c) disposing the fusible mold core in a mold cavity of a lens-barrel-forming mold;
    (d) feeding a molding material into the mold cavity of the lens-barrel-forming mold so as to form the lens barrel between the lens-barrel-forming mold and the fusible mold core and adhered to the fusible mold core, the lens barrel having an inner surface corresponding to the outer peripheral surface of the fusible mold core and defining an inner hole and the inner cam groove recessed from the inner surface and corresponding to the flange of the fusible mold core;
    (e) removing the lens barrel together with the fusible mold core from the mold cavity of the lens-barrel-forming mold; and
    (f) fusing the fusible mold core for separating the fusible mold core from the lens barrel.

2. The method as claimed in claim 1, wherein the step (a) is conducted by preparing a mold-core-forming die having a die cavity corresponding to the fusible mold core, and feeding the fusible alloy into the die cavity of the mold-core-forming die so as to form the fusible mold core.

3. The method as claimed in claim 2, further comprising a step of removing the fusible mold core from the mold-core-forming die before the step (b).

4. The method as claimed in claim 3, wherein the molding material is a plastic material, the step (d) being conducted by injection molding.

5. The method as claimed in claim 4, wherein the step (f) is conducted by eddy current induction heating.

6. The method as claimed in claim 5, further comprising a step of cleaning the lens barrel by supersonic cleaning treatment.

7. The method as claimed in claim 1, wherein the fusible alloy includes bismuth, lead, tin, cadmium, and indium.

8. The method as claimed in claim 7, wherein the fusible alloy has a melting temperature not less than 186° C.

9. The method as claimed in claim 1, wherein the insulating layer is made of a graphite-containing release agent having a refractory temperature not less than 315° C.

10. The method as claimed in claim 1, wherein the molding material includes polycarbonate and fiber.

* * * * *